(12) United States Patent
Jiras

(10) Patent No.: US 7,984,592 B1
(45) Date of Patent: Jul. 26, 2011

(54) SELF-CLEANING INVERTED J-SHAPED VENTILATED GRAIN BIN ROOF RIB

(76) Inventor: Raymond J. Jiras, Oxford, IA (US)

(*) Notice: Subject to any disclaimer, the term of this patent is extended or adjusted under 35 U.S.C. 154(b) by 305 days.

(21) Appl. No.: 12/393,501

(22) Filed: Feb. 26, 2009

Related U.S. Application Data

(60) Provisional application No. 61/067,390, filed on Feb. 29, 2008.

(51) Int. Cl.
*E04B 7/12* (2006.01)
*E04B 7/02* (2006.01)

(52) U.S. Cl. .............. 52/82; 52/192; 52/302.1; 52/79.6; 52/745.06

(58) Field of Classification Search .............. 52/82, 413, 52/57, 519, 79.6, 80.1, 192, 748.1, 745.06, 52/745.08, 302.1, 302.2
See application file for complete search history.

(56) References Cited

U.S. PATENT DOCUMENTS

| | | | | |
|---|---|---|---|---|
| 1,106,150 A | * | 8/1914 | Martin | 52/19 |
| 1,161,115 A | * | 11/1915 | Duffin | 52/82 |
| 1,267,684 A | * | 5/1918 | Moomaw | 454/175 |
| 1,844,961 A | * | 2/1932 | Kramer | 52/82 |
| 1,924,480 A | * | 8/1933 | Bayley | 119/437 |
| 2,151,234 A | * | 3/1939 | Rutten et al. | 52/81.4 |
| 2,742,116 A | * | 4/1956 | Fitzgerald | 52/82 |
| 2,899,719 A | * | 8/1959 | Shapiro | 52/75 |
| RE26,165 E | * | 2/1967 | Stolz | 52/81.4 |
| 3,316,682 A | * | 5/1967 | Natalis | 52/236.1 |
| 3,583,112 A | * | 6/1971 | Kennedy | 52/82 |
| 6,698,143 B2 | * | 3/2004 | Jensen et al. | 52/82 |
| 7,338,359 B2 | | 3/2008 | Grossman et al. | |
| 2003/0217520 A1 | * | 11/2003 | Jensen et al. | 52/82 |

FOREIGN PATENT DOCUMENTS

GB 2235476 A * 3/1991

* cited by examiner

*Primary Examiner* — Phi Dieu Tran A
(74) *Attorney, Agent, or Firm* — Simmons Perrine Moyer Bergman PLC

(57) ABSTRACT

A self-cleaning grain bin roof configured to allow ventilation through the roof ribs which has a trapezoidal shaped inner rib with ventilation orifices therein and a spaced apart and partially covering outer rib configured to inhibit precipitation from falling through the orifices while permitting air to be blown from inside the grain bin outside. The trapezoidal shape providing for a self-cleaning ability in that if matter is blown to the orifices by positive pressure in the grain bin, it will, in the event of a loss of pressure, either fall outside of the orifices and slide down one of the slanted trapezoidal sides, or return to the grain bin. If debris blown by wind gathers on the roof, it will be blown out from under the outer rib by the airflow through the orifices.

11 Claims, 5 Drawing Sheets

SELF-CLEANING INVERTED J-SHAPED VENTILATED GRAIN BIN ROOF RIB

CROSS-REFERENCE TO RELATED APPLICATIONS

This application claims the benefit of a provisional application having Ser. No. 61/067,390 filed on Feb. 29, 2008 by Raymond John Jiras et al. entitled Raymond's J-rib.

BACKGROUND OF THE INVENTION

This invention relates to ventilated grain bin roof ribs. Grain bins often have sheet metal roofs made of metal sheets with overlapping stepped roof ribs to provide strength and rigidity. Typically, these grain bin roofs also are ventilated with J hatches, which are covered air ports in the roof which allow air to flow between the bin and the atmosphere. These J hatches are very common, but are well known to cause problems of snow and/or debris accumulation above the J hatch. This can result in unwanted and potentially damaging excess weight on the grain bin roof, as well as creation of a rust or corrosion prone area.

U.S. Pat. No. 7,338,359 described a grain bin roof rib system which includes a double ventilated wall rib system which provides a void for retaining therein a sliding air valve member. While this design has some benefits, it has several drawbacks as well.

The void for retaining the sliding air valve member could be prone to accumulating debris (dust, dirt, seeds, insects, etc.) especially when the grain bin blower is turned off and any debris located between the two ventilated walls of the rib could settle into and fill the gap between the two walls. Emptying these voids or gaps could be a non-trivial task. The full double wall design also consumes a large amount of metal for each roof and increases weight over many prior art ribbed roof systems.

Consequently, there exists a need for improved grain bin ventilation systems and structures which do not exhibit the shortcomings of such prior art systems.

SUMMARY OF THE INVENTION

More specifically, an object of the invention is to provide a cost-effective low-maintenance grain bin ventilation system.

It is a feature of the present invention to include a ventilated roof rib with a full interior ventilated roof rib, disposed below, but spaced apart from portions of a partial non-ventilated exterior roof rib.

It is an advantage of the present invention to avoid accumulation of debris between the two walls.

The present invention includes the above-described features and achieves the aforementioned objects.

Accordingly, the present invention comprises a grain bin roof rib system with a ventilated roof rib having a self-cleaning configuration of sloped side walls.

BRIEF DESCRIPTION OF THE DRAWINGS

In the following description of the drawings, like reference numerals are employed to indicate like parts in the various views.

DETAILED DESCRIPTION OF THE DRAWINGS

Figure 1:
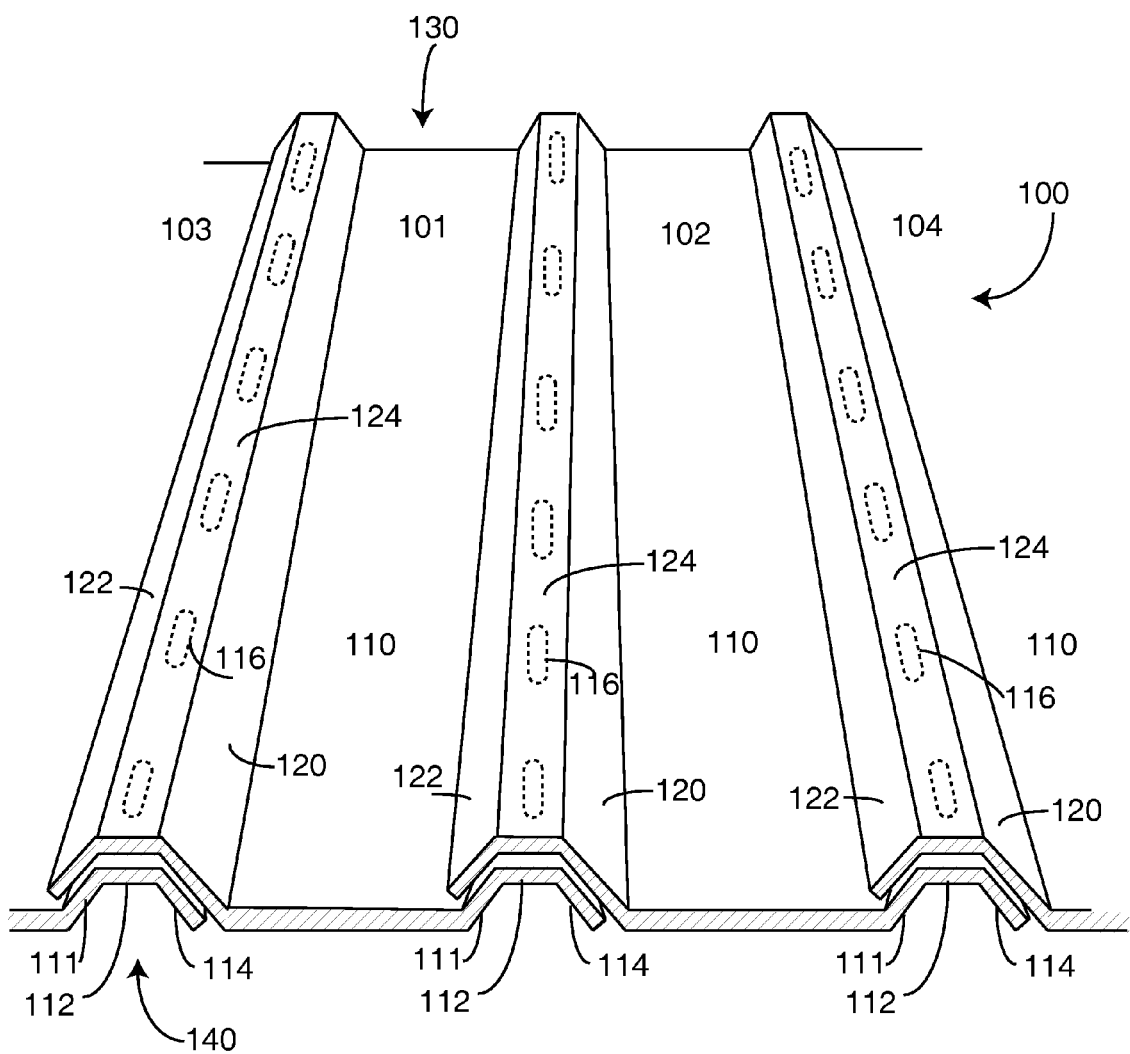
FIG. 1 is a perspective view of the system of the present invention wherein the intermittent lines show concealed inner covered top side orifices.

Referring now to the drawings, where like numerals refer to like matter throughout, and more particularly to FIG. 1, there is shown a perspective view of an assembled array of roof sheets including first sheet 101, second sheet 102, partial third sheet 103 and partial 4th sheet 104. The sheets 101-104 are shown with a tapered flat rib separating segment 110, for a roof for a circular bin, but tapered and non-tapered segments could be used as well for non-circular bins. The array 100 has a peak end 130 which may be near the peak of the roof. Also shown is side wall end 140 which might end near a side wall of a grain bin. The sheets may be made of galvanized steel, aluminum, molded plastic, or other suitable substitute.

Figure 2:
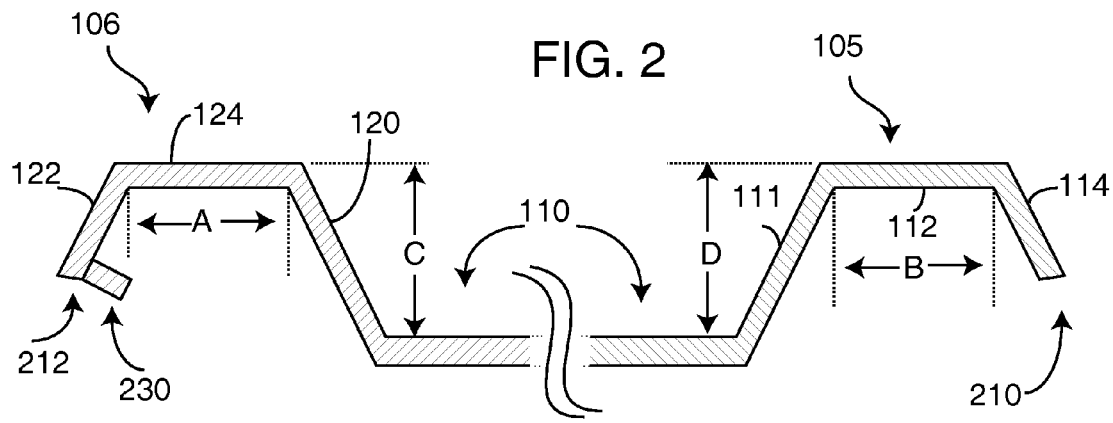
FIG. 2 is a side wall end view of a full sheet of FIG. 1.

Now referring to FIGS. 1 and 2, each sheet 101-104 may include identical structure, including an inner rib end 105 with an inner partially exposed sloped side 111, inner top side 112 and inner covered sloped side 114. Each sheet also includes an opposing end to inner rib end 105 and outer rib end 106, which generally is caused to nest over an inner rib end 105 of an adjacent sheet. Inner top side 112 may be provided with inner covered top side ventilation orifices 116 (which are shown with phantom lines as they are concealed by outer top 124 and outer full sloped side 120 on one side and outer partial sloped side 122 on the opposite side. It may be preferred that inner covered sloped side 114 and outer full sloped side 120 are close fitting, while inner top side 112 and outer top 124 are spaced apart to facilitate ventilation. It also is preferred that the inner covered sloped side 114 be longer than is shown in FIGS. 2-5 and that it extend downward, so that it is at the same level as the bottom of the flat rib separating segment 110.

The space is a matter of design choice for a particular implementation, use and climate, but one-half to 1-inch space may be common.

Now referring to FIG. 2, there is shown an end view of either first sheet 101 or second sheet 102. It should be understood that the dimension A of the width of outer top side 124 is wider than the dimension B of inner top side 112. This permits a gap between the two sides outer partial sloped side 122 and inner partially exposed sloped side 111 to facilitate airflow therebetween. Similarly, as discussed above, the dimension C is larger than the dimension D. This spacing apart of the top sides too facilitates airflow. An optional spacer 230 can be deployed on the inside of outer partial sloped side 122 to prevent it from contacting inner partially exposed sloped side 111 so as to close off ventilation. Spacer 230 can be a series of protuberances spaced appropriately along the inside of outer partial sloped side 122. In an alternate embodiment, optional spacers 230 could be disposed on the outside of inner partially exposed sloped side 111 in a similar manner for the same purpose.

Figure 3:
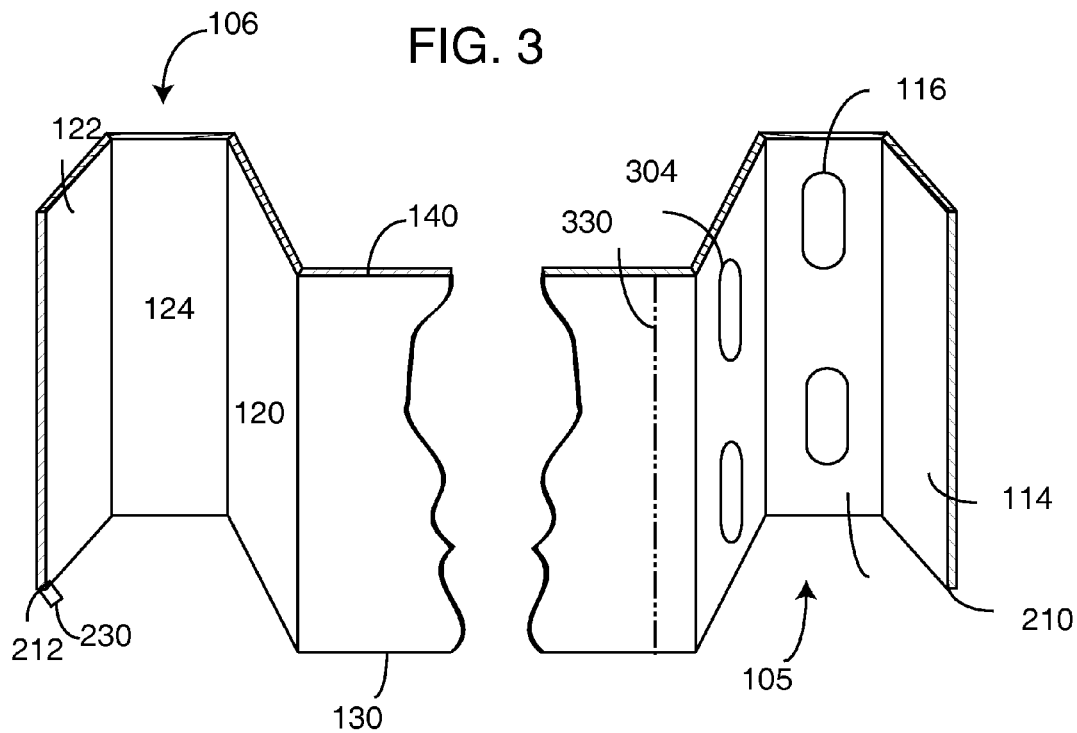
FIG. 3 is a perspective view of the full sheet of FIGS. 1-2, looking upward at an underside of the sheet.

Now referring to FIG. 3, there is shown a perspective view of the underside of first sheet 101 of FIG. 2, wherein it clearly shows end point 210 and terminal edge 212, together with the side ventilation orifices 304 and inner covered top side orifices 116, which can be any type of holes, slots, perforations, slits or ventilation passages. These orifices could be drilled, stamped, molded in, cut out, burned or any other method of creating a ventilation passage in a sheet of suitable material. The differing segments of the sheets can be made using various methods, depending upon the materials used, such as stamping, bending, welding, molding, etc. Also shown is an optional top sheet restricting protuberance 330 which may help locate and retain outer partial sloped side 622 in an alternate embodiment shown in FIGS. 6 and 7. While FIG. 3 shows both side orifices 304 and inner covered top side orifices 116, it may be preferred that just one of theses sets of holes is used, and it may be preferred that side orifices 304 are used and the inner top side 112 is used for bolts, etc. as is well known in the art for assembly of prior art ribbed grain bin roofs. Also, side orifices 304 are shown disposed in the center of inner partially exposed sloped side 111; however, in a preferred embodiment, the side orifices 304 may be higher up the side of inner partially exposed sloped side 111 nearer the junction with inner top side 112.

Figure 4:
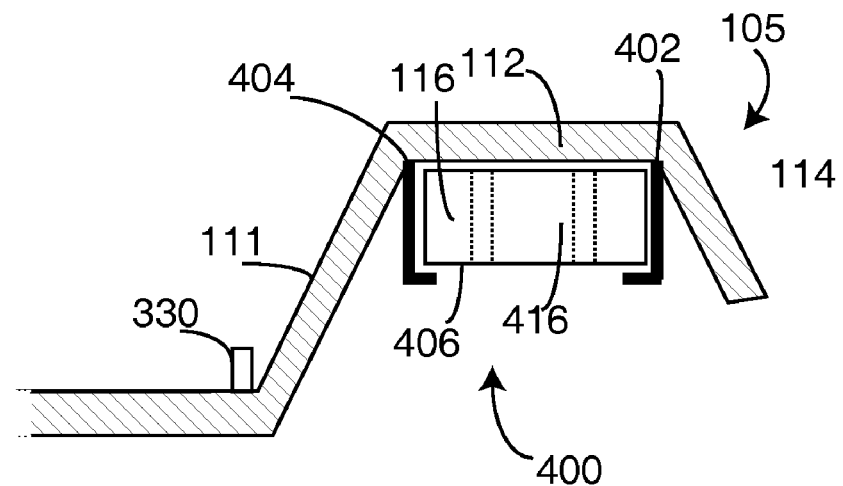
FIG. 4 is an end view of an alternate embodiment of the present invention, where the intermittent lines show the location of inner covered top side orifices 116 and the holes or air ports 416 in sliding member 406.

Now referring to FIG. 4, there is shown an alternate embodiment of the present invention with a top sliding airflow valve system 400 which comprises a sliding member with air ports 406 which is held by flange 402 and flange 404. The sliding member with air ports 406 is an optional feature and may have limited utility and may be restricted to particular applications.

Figure 5:
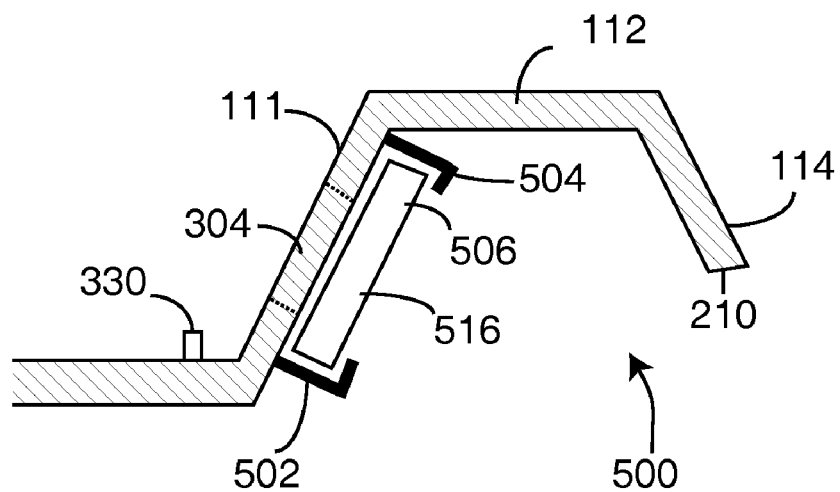
FIG. 5 is an end view of an alternate embodiment of the present invention, where the intermittent lines show the location of side orifices 304 and the holes or air ports 516 in sliding member 506.

Now referring to FIG. 5, there is shown the nearly identical portion of the sheet except that the side orifices 304 are deployed and side sliding airflow valve system 500 is similarly deployed, with flange 502, flange 504, sliding member 506 with air ports 516. The intermittent lines show where air ports 516 and orifice 304 could be located. In one embodiment, the air ports 516 and the side orifices 304 are sized, located and spaced so that sliding the sliding member with air ports 506 can either open up the airflow through side orifices 304 completely or completely close it down. Of course, side sliding airflow valve system 500 is an optional system which could be easily eliminated if desired.

Figure 6:
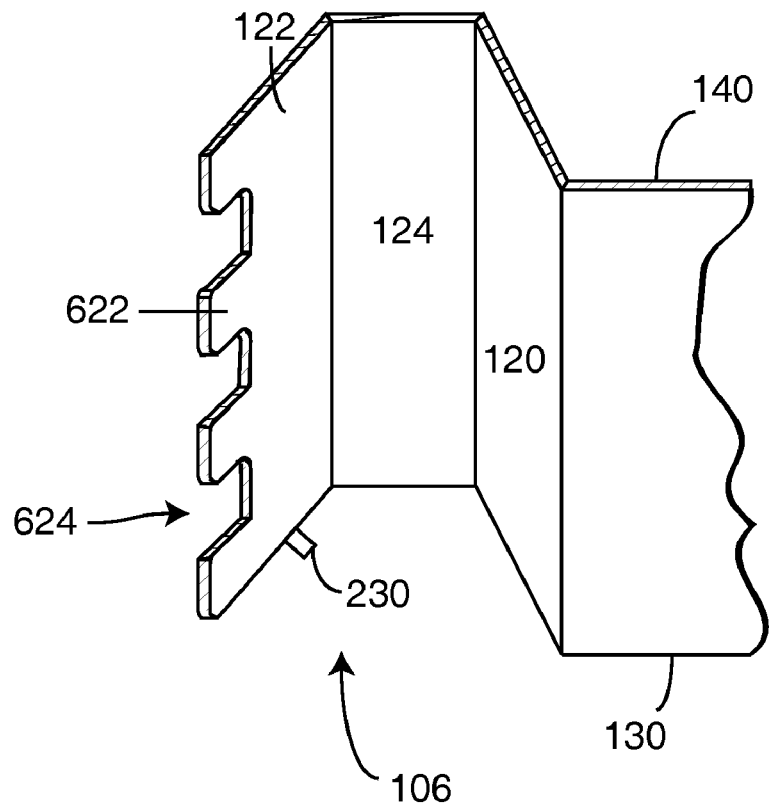
FIG. 6 is a perspective view of an alternate embodiment of the present invention.

Now referring to FIG. 6, there is shown a perspective view of an alternate embodiment of the present invention where the outer partial sloped side 622 is extended down to the flat rib separating segment 110, but with airflow side ports 624 for facilitating airflow also shown. This arrangement provides for extra strength and positive separation between the inner partially exposed sloped side 111 and the outer partially sloped side 622 to assure ventilation.

Figure 7:
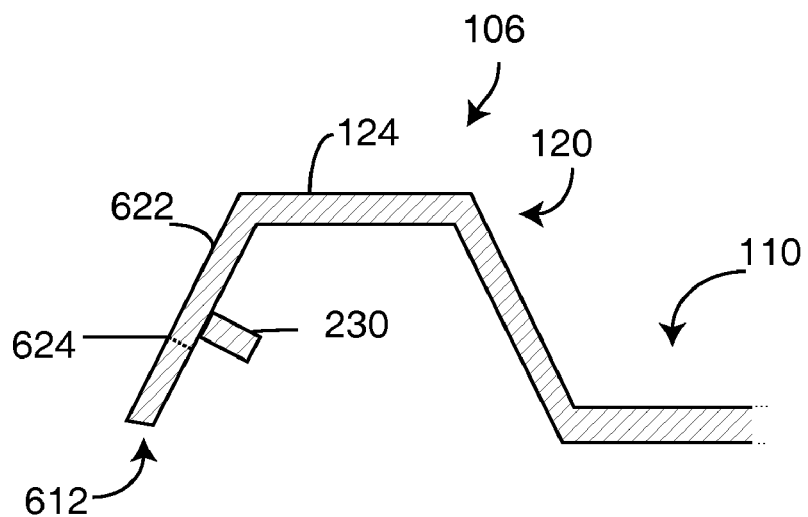
FIG. 7 is an end view of an alternate embodiment of FIG. 6.

Now referring to FIG. 7, there is shown an end view of the structure of FIG. 6 showing outer sloped side terminal edge 612 which may meet and cooperate with optional top sheet restricting protuberance 330 (FIGS. 3-5) to hold the outer partially sloped side 622 in proper orientation with respect to inner partially exposed sloped side 111.

Figure 8:
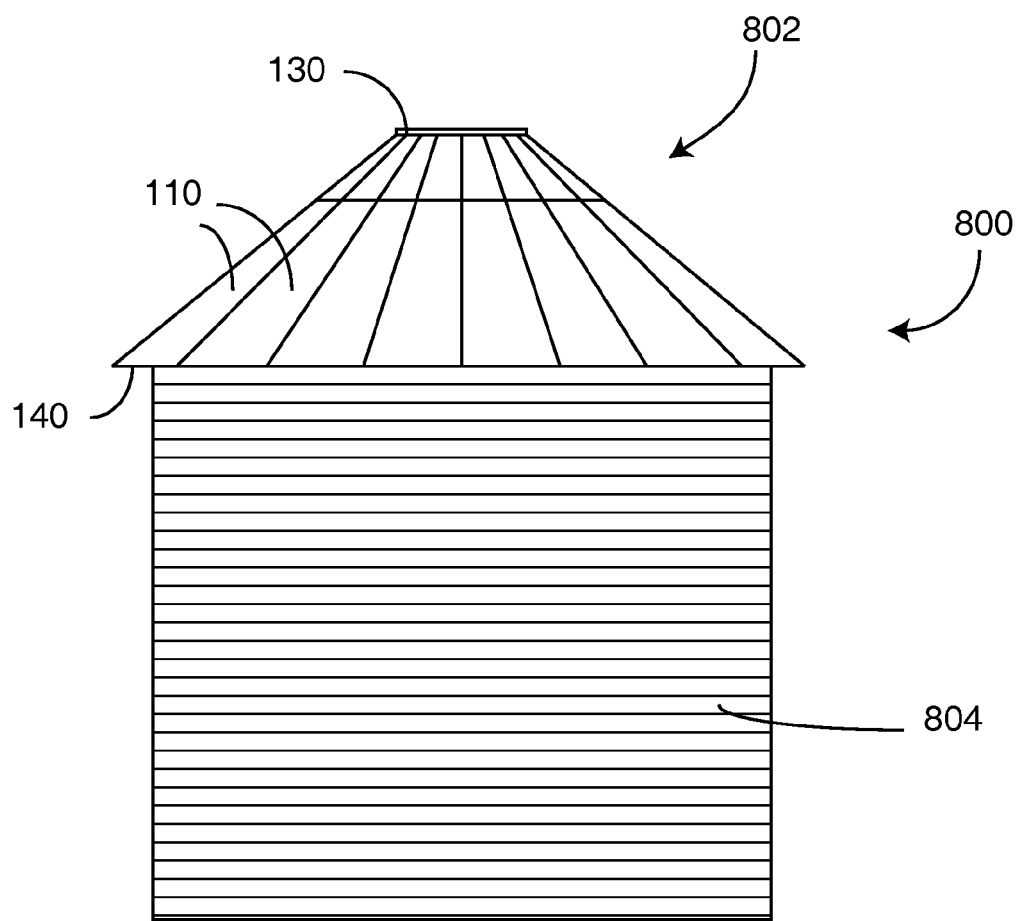
FIG. 8 is a perspective view of a grain bin of the present invention.

Now referring to FIG. 8, there is shown a grain bin of the present invention, generally designated 800 having a grain bin roof 802 utilizing the present invention, disposed on grain bin side walls 804.

Throughout this description, the terms "grain bin" have been used as it is believed that the present invention is well suited to use with grain bins. However, it should be understood that the innovating ventilated roof rib system of the present invention could be used with other structures as well; grain bins are merely believed to be an excellent example of their utility.

It is believed that when these teachings are combined with the known prior art by a person skilled in the art of grain bin manufacturing and operation of such grain bins, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense. The above-described embodiments are intended to be merely examples of the many other possible embodiments still falling within the scope of the present invention.

I claim:

1. A grain bin configured to store grain therein, comprising:
a grain bin side wall structure comprising corrugated metal creating a substantially circular-shaped container;
a grain bin roof comprising:
a plurality of linked-together sheets which, when combined and coupled together, cover an interior of the grain bin side wall structure from exposure to weather;
a first sheet of said plurality of sheets configured with a first inner rib end and an opposing first outer rib end with a first flat rib separating segment disposed therebetween;
said first inner rib end further comprising:
a first inner partially exposed sloped side coupled to said first flat rib separating segment and further coupled to said first inner top side which is coupled to a first inner covered sloped side;
disposed in at least one of said first inner partially exposed sloped side and said first inner top side is a plurality of first inner covered orifices for facilitating ventilation;
said first outer rib end further comprising:
a first outer full sloped side which is coupled between said first flat rib separating segment and a first outer top full side which is coupled with a first outer partial sloped side;
a second sheet of said plurality of sheets configured with a second inner rib end and an opposing second outer rib end with a second flat rib separating segment disposed therebetween;
said second inner rib end further comprising:
a second inner partially exposed sloped side coupled to said second flat rib separating segment and further coupled to said second inner top side which is coupled to a second inner covered sloped side;
disposed in at least one of said second inner partially exposed sloped side and said second inner top side is a plurality of second inner covered orifices for facilitating ventilation;
said second outer rib end further comprising:
a second outer full sloped side which is coupled between said second flat rib separating segment and a second outer top full side which is coupled with a second outer partial sloped side;
said second outer rib end of said second sheet is configured to nest over top of said first inner rib end of said first sheet so that said second outer partial sloped side and said first inner partially exposed sloped side form an airflow gap therebetween and in combination inhibit precipitation from entering an interior of said grain bin side wall structure through said first inner covered orifices while still permitting a substantial air flow to occur through said airflow gap between said second outer rib end and said first inner rib end and through said first inner covered orifices.

2. The grain bin of claim 1 wherein said second outer rib end and said first inner rib end each have a substantially trapezoidal cross-sectional shape.

3. The grain bin of claim 1 wherein said first inner covered sloped side is substantially parallel with and in contact with said second outer full sloped side.

4. The grain bin of claim 3 wherein said first inner top side is separated from said second outer top full side by a gap for allowing air flow from the atmosphere into an interior of said grain bin side wall structure.

5. The grain bin of claim 4 wherein said first inner partially exposed sloped side is partially covered by said second outer partial sloped side.

6. The grain bin of claim 5 wherein said second outer partial sloped side extends in part to said flat rib separating segment, but having a plurality of second airflow side ports therein.

7. The grain bin of claim 6 wherein said plurality of first inner covered orifices are disposed in said first inner top side.

8. The grain bin of claim 6 wherein said plurality of first inner covered orifices are disposed in said first inner partially exposed sloped side.

9. The grain bin of claim 5 further comprising a sliding means for variably restricting airflow through said plurality of first inner covered orifices.

10. The grain bin of claim 9 further comprising a plurality of protuberance disposed between and maintaining positive separation between said second outer partial sloped side and said first inner partially exposed sloped side.

11. A method for storing grain comprising the steps of:
providing a substantially vertical side wall of corrugated galvanized metal arranged in a circular configuration so as to create a cylinder configured to receive and retain grain therein;
providing a plurality of identical roof panels wherein each of said plurality of identical roof panels is configured to mate with two other panels of said plurality of identical panels so as to create a continuous roof portion;
providing on opposing ends of each of said plurality of identical roof panels an inner rib end and an outer rib end;
nesting an outer rib end of one of said plurality of identical roof panels over an inner rib end of an adjacent one of said plurality of identical roof panels so as to define an airflow gap therebetween and to permit a substantial air flow through said airflow gap and to inhibit precipitation from penetrating said plurality of identical roof panels through a plurality of orifices disposed in said inner rib end;
providing a sliding member disposed entirely below said plurality of orifices for regulation of airflow capacity by variable registration between said plurality of orifices and a plurality of air ports in said sliding member;
providing a plurality of structural members in cooperation with an outer partial sloped side of said outer rib so as to help maintain an open airflow passage through said combination of said outer rib and said inner rib.

* * * * *